(12) United States Patent
Cho et al.

(10) Patent No.: US 11,279,365 B2
(45) Date of Patent: Mar. 22, 2022

(54) IN VEHICLE CONTROL APPARATUS AND METHOD FOR CONTROLLING THE SAME

(71) Applicants: Hyundai Motor Company, Seoul (KR); Kia Motors Corporation, Seoul (KR)

(72) Inventors: Jae Hyeong Cho, Gyeonggi-do (KR); Yeon Ji Kang, Gyeonggi-do (KR); Pill Yoon Kim, Gyeonggi-do (KR); Jae Min Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 55 days.

(21) Appl. No.: 16/849,479

(22) Filed: Apr. 15, 2020

(65) Prior Publication Data

US 2020/0324772 A1    Oct. 15, 2020

Related U.S. Application Data

(60) Provisional application No. 62/834,361, filed on Apr. 15, 2019.

(30) Foreign Application Priority Data

Apr. 1, 2020 (KR) ......................... 10-2020-0039710

(51) Int. Cl.
*B60K 37/06* (2006.01)
*B60W 30/188* (2012.01)
*B60W 10/06* (2006.01)
*B60W 10/10* (2012.01)

(52) U.S. Cl.
CPC .......... *B60W 30/188* (2013.01); *B60K 37/06* (2013.01); *B60W 10/06* (2013.01); *B60W 10/10* (2013.01)

(58) Field of Classification Search
CPC .... B60W 10/06; B60W 10/10; B60W 30/188; B60K 37/06; B60K 2370/126; B60K 2370/131; F16H 59/0217; F16H 59/0278; F16H 2059/081
See application file for complete search history.

(56) References Cited

U.S. PATENT DOCUMENTS

| | | | |
|---|---|---|---|
| 2004/0110600 A1 * | 6/2004 | Sekino | F16H 59/105 477/99 |
| 2017/0227119 A1 * | 8/2017 | Buttolo | B60K 20/08 |
| 2017/0261097 A1 * | 9/2017 | Yamanaka | B60K 20/02 |
| 2018/0274665 A1 * | 9/2018 | Botella | F16H 63/3491 |

* cited by examiner

*Primary Examiner* — Edwin A Young
(74) *Attorney, Agent, or Firm* — Mintz Levin Cohn Ferris Glovsky and Popeo, P.C.; Peter F. Corless

(57) ABSTRACT

An in-vehicle control apparatus which executes various functions of a vehicle and a method for controlling the same are provided. The in-vehicle operating apparatus includes an operating unit assembly and a drive unit that is configured to rotate the operating unit assembly about one axis. The operating unit assembly includes a body, a first operating unit disposed at a first side of the body and configured to receive a first command to execute at least a first function, and a second operating unit disposed at a second side of the body opposite to the first side of the body and configured to receive a second command to execute at least a second function.

17 Claims, 9 Drawing Sheets

IN VEHICLE CONTROL APPARATUS AND METHOD FOR CONTROLLING THE SAME

CROSS-REFERENCE TO RELATED APPLICATION(S)

This application claims the benefit of Korean Patent Application No. 10-2020-0039710, filed on Apr. 1, 2020, which is hereby incorporated by reference as if fully set forth herein. This application also claims the benefit of U.S. Provisional Application No. 62/834,361, filed on Apr. 15, 2019, the contents of which are hereby incorporated by reference in their entirety.

BACKGROUND

Field of the Invention

The present invention relates to an in-vehicle control apparatus, and more particularly, to an in-vehicle control apparatus that controls various functions of a vehicle and a method for controlling the same.

Discussion of the Related Art

As electronic equipment mounted within vehicles becomes more diverse, types and ranges of functions capable of being controlled by users are increasing. In response thereto, changes are being developed to operating apparatuses.

Conventional operating apparatuses are developed to allow a driver to directly control a greater number of types of functions. However, recently, to control a function to be operated, which is displayed on a display, a central control point (CCP)-based tree-type menu structure is used, and some vehicles additionally provide a voice recognition function. Moreover, as complex functions are automatically set in a vehicle based on user's tendencies, the importance of operating apparatuses as an element of interior design, rather than merely as an element for individually controlling various functions, is increasing.

SUMMARY

Accordingly, the present invention is directed to an in-vehicle control apparatus and a method for controlling the same. An object of the present invention is to provide an in-vehicle control apparatus which may more conveniently control functions of a vehicle and a method for controlling the same. Another object of the present invention is to provide an in-vehicle control apparatus which may control various functions of a vehicle and a method for controlling the same.

Additional advantages, objects, and features of the invention will be set forth in part in the description which follows and in part will become apparent to those having ordinary skill in the art upon examination of the following, or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an in-vehicle operating apparatus may include an operating unit assembly, and a drive unit configured to rotate the operating unit assembly about an axis. The operating unit assembly may include a body, a first operating unit disposed at a first side of the body and configured to receive a first command to execute at least a first function, and a second operating unit disposed at a second side of the body opposite to the first side of the body and configured to receive a second command to execute at least a second function.

In another aspect of the present invention, a method for controlling an in-vehicle operating apparatus may include activating a first state of the in-vehicle operating apparatus when a starting preparation condition is satisfied, converting the in-vehicle operating apparatus from the first state to a second state when an operating unit assembly of the in-vehicle operating apparatus is operated under an activated condition of the first state, and converting the in-vehicle operating apparatus from the second state to the first state when a condition conversion condition is satisfied in the second state.

The operating unit assembly may include a body, a first operating unit disposed at a first side of the body and configured to receive a first command to execute at least a first function, and a second operating unit disposed at a second side of the body opposite to the first side of the body and configured to receive a second command to execute at least a second function. The first state may include a state in which the first operating unit is operable, and the second state may include a state in which the second operating unit is operable.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to exemplary embodiments of the present invention, examples of which are illustrated in the accompanying drawings. However, the disclosure of the invention is not limited to the exemplary embodiments set forth herein and may be variously modified. In the drawings, to clearly describe the present invention, descriptions of elements which are not related to the present invention are omitted, and the same or similar elements are denoted by the same reference numerals even when they are depicted in different drawings.

One exemplary embodiment of the present invention provides an operating apparatus including two or more operating units which are rotatable about one axis (e.g., a first axis) and have exposed positions thereof that change depending on rotational states thereof. In particular, the rotational states of the operating units may be changed based on a vehicle state or driver's operation.

Figure 1:
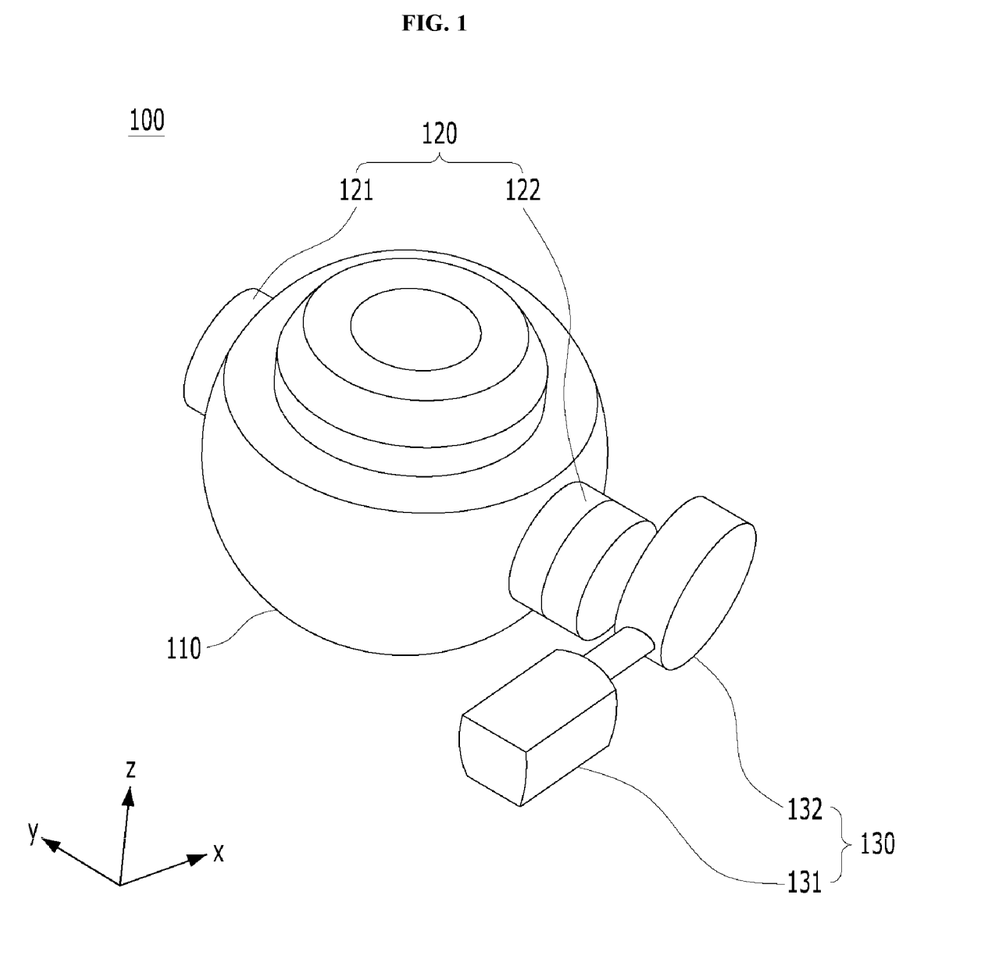
FIG. 1 is a perspective view illustrating one example of the configuration of an operating apparatus according to one exemplary embodiment of the present invention.

FIG. 1 is a perspective view illustrating one example of the configuration of an operating apparatus according to one exemplary embodiment of the present invention. Referring to FIG. 1, an operating apparatus 100 according to this exemplary embodiment may include an operating unit assembly 110, a shaft unit 120 which extends from the operating unit assembly 110 along an axis about which the operating unit assembly 110 is rotated, and a drive unit 130 configured to rotate the shaft unit 120.

The operating unit assembly 110 may have a spherical or cylindrical shape, and may include two or more operating units having command input units to execute different respective functions to be controlled. The command input unit may include a proximity sensor, a fingerprint recognition sensor, a wheel sensor to sense rotation of a dial, a touch sensor, a push button or the like, without being limited thereto. The detailed configuration of the operating unit assembly 110 will be described in more detail later with reference to FIGS. 2A to 5.

The shaft unit 120 may include a first shaft 121 which extends from a first side of the operating unit assembly 110 along a rotary axis (i.e., the y-axis), and a second shaft 122 which extends from a second side of the operating unit assembly 110 opposite to the first shaft 121 along the rotary axis. In particular, the first shaft 121 may be inserted into a recess (not shown) formed in a housing 200A, 200B or 200C, which will be described later, and the second shaft 122 may be connected to the drive unit 130.

These connection relations of these first and second shafts 121 and 122 to other elements are only exemplary, and the first and second shafts 121 and 122 are not limited thereto. For example, each of the first and second shafts 121 and 122 may be connected to a drive unit. In some exemplary embodiments, a stopper (not shown) may be disposed on the shaft unit 120, and cause interference with the housing 200A, 200B or 200C at a specific angle of rotation to restrict the range of rotation of the operating unit assembly 110.

The drive unit 130 may include a motor 131 which is driven by an electrical control signal from a controller (not shown), and a gear unit 132 which converts power of the motor 131 into rotation of the shaft unit 120. The gear unit 132 may include a rack gear and a pinion gear based on relative arrangement directions of the motor 131 and the gear unit 132, and have a gear configuration in which rotating torque of the shaft unit 120 is increased through a decrease in the revolutions per minute (RPM) of the shaft unit 120 to the RPM of the motor 131, without being limited thereto.

The controller (not shown) may be implemented as a control unit configured to operate an integrated operating apparatus, such as a central control panel (CCP), or be a separate control unit configured to operate the operating apparatus 100 according to this exemplary embodiment, without being limited thereto. However, in order to execute functions, such as functions of a powertrain (e.g., turning on/off an ignition, shifting, etc.) which will be described later, the controller (not shown) may be implemented to be communicable with control units relating to functions to be executed (e.g., an engine control unit, a transmission control unit, etc.).

Figure 2A:
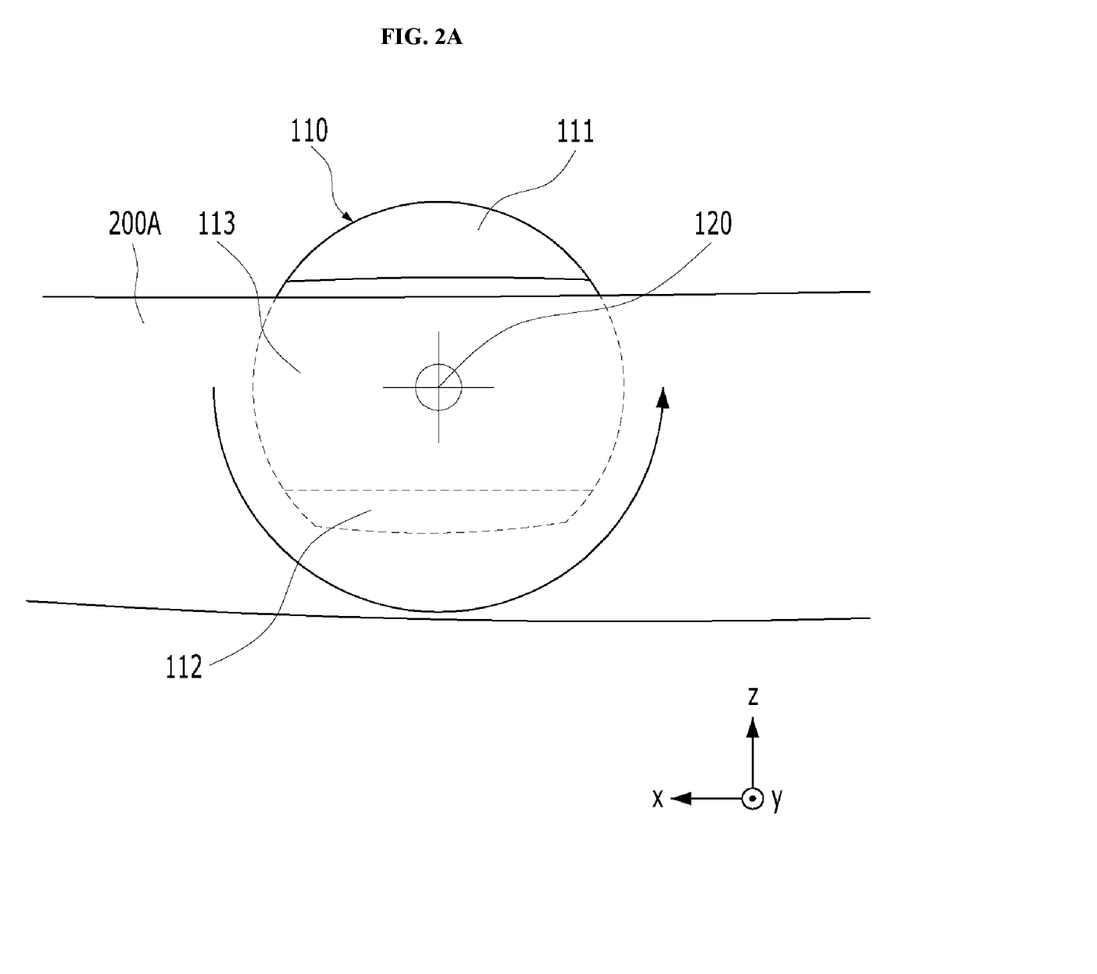
FIGS. 2A and 2B are views illustrating a first state and a second state of the operating apparatus according to one exemplary embodiment of the present invention, respectively.
Figure 2B:
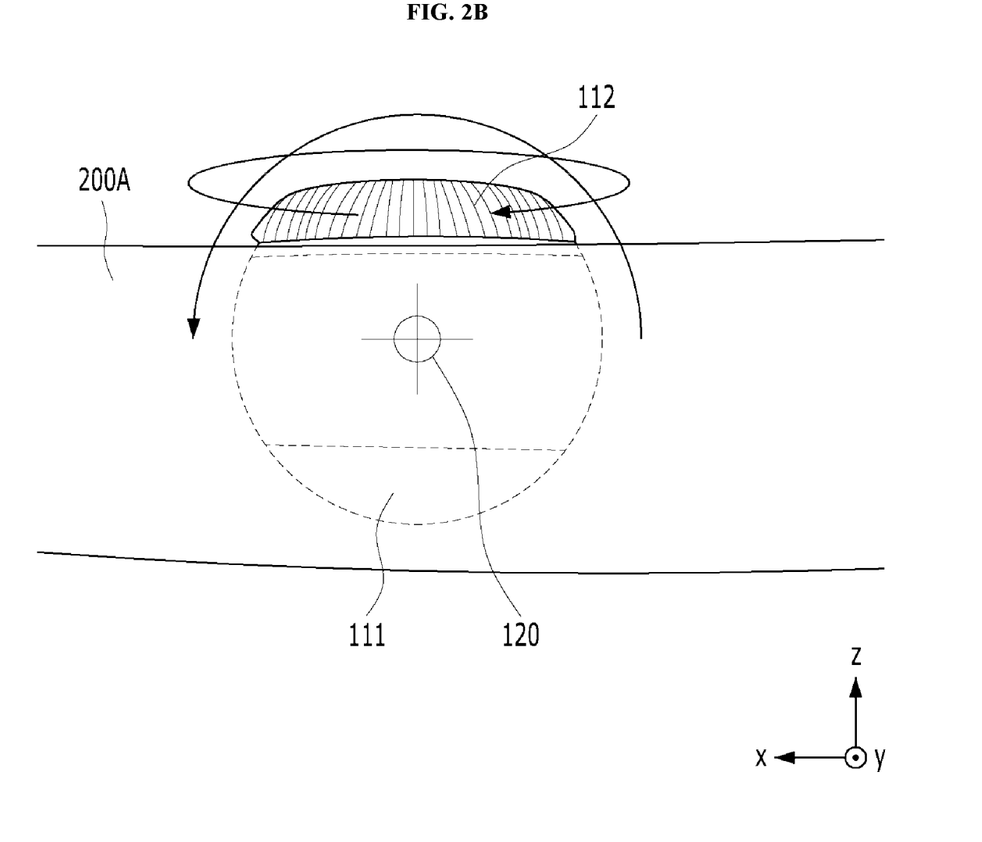

FIGS. 2A and 2B are views illustrating a first state and a second state of the operating apparatus according to one exemplary embodiment of the present invention, respectively. Referring to FIGS. 2A and 2B, the operating unit assembly 110 according to one exemplary embodiment may include a body 113 on which the shaft unit 120 may be disposed, a first operating unit 111 disposed at a first side of the body 113, and a second operating unit 112 disposed at a second side of the body 113 opposite to the first side of the body 113 having the first operating unit 111 disposed thereon. In particular, the body 113 may have a shape acquired by cutting away two mutually opposing dome-shaped sides from a sphere.

The first operating unit 111 may have a dome shape. If the curvature of an outer part of the first operating unit 111 is the same as the curvature of a side part of the body 113, when the first operating unit 111 is coupled to the body 113, the upper part of the operating unit assembly 111 may form a hemispherical shape on a horizontal plane including the rotary axis (i.e., the y-axis) in the state shown in FIG. 2A.

The second operating unit 112 may have a dome shape from which one end (corresponding to the top) is cut away. For example, the second operating unit 112 may include a dial which is rotatable about another or second axis (herein, the z-axis) intersecting the rotary axis (i.e., the y-axis) about which the operating unit assembly 110 is rotated, as shown in FIG. 2B. An uneven pattern for non-slip grip when operating the dial may be formed on the outer surface of the dial.

At least a portion of the above-described operating apparatus 100 may be embedded in the housing 200A, and the operating apparatus 100 may be in the first state or in the second state based on the rotational state thereof. For example, at least the shaft unit 120 and the drive unit 130 may be embedded in the housing 200A at all times. In the first state, as shown in FIG. 2A, the first operating unit 111 may be exposed to the outside through an opening formed in the upper surface of the housing 200A, and the body 113 and the second operating unit 112 may not be exposed to the outside from the housing 200A.

Further, in the second state, in which the operating unit assembly 110 is rotated about 180 degrees from the first state about the rotary axis, as shown in FIG. 2B, the second operating unit 112 may be exposed to the outside through the opening formed in the upper surface of the housing 200A, and the body 113 and the first operating unit 111 may not be exposed to the outside from the housing 200A. In particular, the housing 200A may form at least a portion of a center console or a center armrest between a driver's seat and a front passenger seat, without being limited thereto.

Figure 3A:
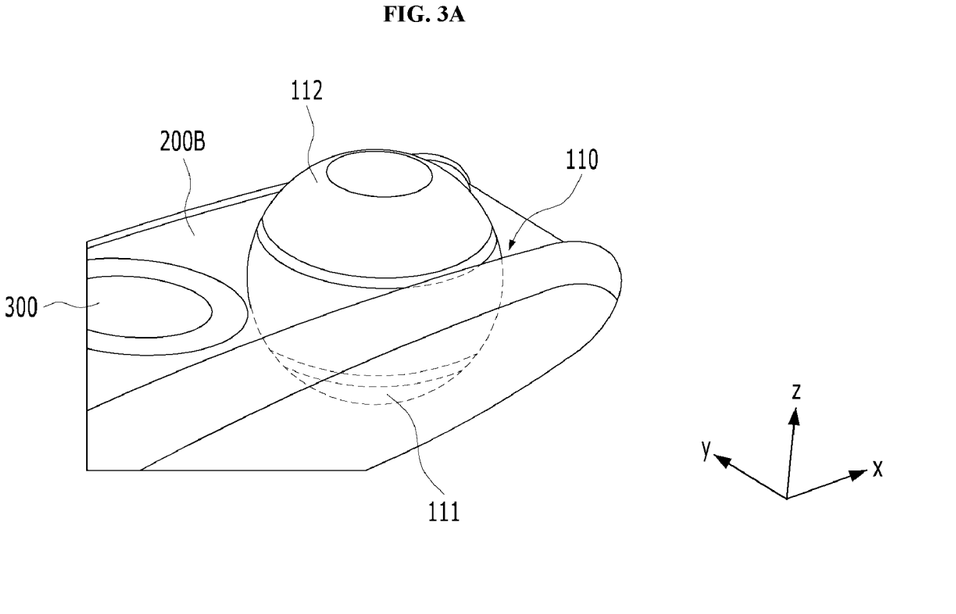
FIGS. 3A and 3B are views illustrating one example of exposure of both a first operating unit and a second operating unit of the operating apparatus according to one exemplary embodiment.
Figure 3B:
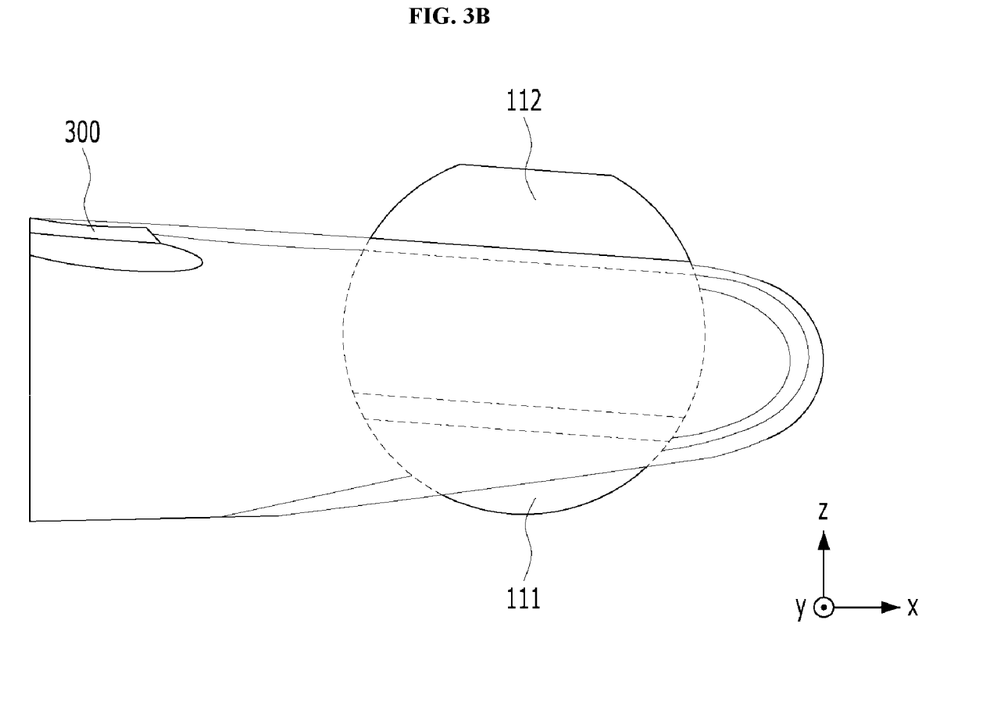

FIGS. 3A and 3B are views illustrating one example of exposure of both the first operating unit and the second operating unit of the operating apparatus according to one exemplary embodiment. Referring to FIGS. 3A and 3B, an opening may be formed in each of the upper and lower surfaces of a housing 200B. In particular, in the second state, in which the second operating unit 112 is exposed to the outside through the opening formed in the upper surface of the housing 200B, as shown in these figures, at least a portion of the first operating unit 111 may also be exposed downwards to the outside through the opening formed in the lower surface of the housing 200B.

When a light source is disposed on the first operating unit 111, the first operating unit 111 may have difficulty receiving a command from a passenger, but may provide a lighting function (e.g., ambient light). In some exemplary embodiments, another type of operating apparatus, for example, a central control point (CCP) 300, may additionally be disposed on the upper surface of the housing 200B on which the operating unit assembly 110 may be disposed.

To sum up the above description with reference to FIGS. 2A to 3B, the first state may be a state in which at least the first operating unit 111 is exposed to the outside so as to be operable by a driver, and the second state may be a state in which at least the second operating unit 112 is exposed to the outside to be operable by the driver. Further, depending on the configuration of the housing, when a specific operating unit is exposed upwards to the outside through an opening in a specific state, a remaining operating unit may be disposed within the housing to prevent exposure to the outside, or may also be exposed to the outside through another opening.

Figure 4A:
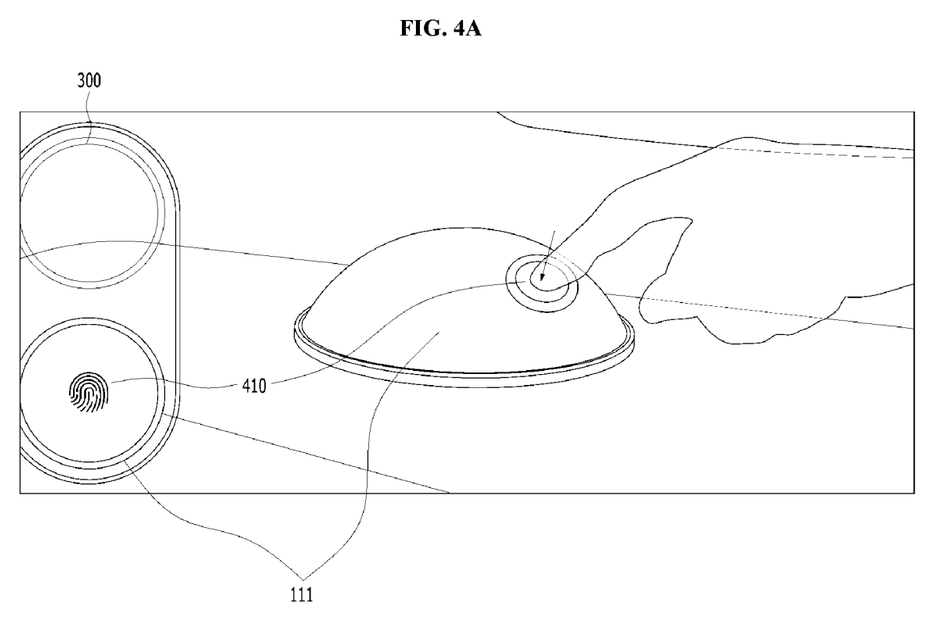
FIG. 4A is a view illustrating one example of functioning of the first operating unit of the operating apparatus according to one exemplary embodiment as a starting button.

Hereinafter, exemplary configurations of the operating units of the operating unit assembly will be described in detail with reference to FIGS. 4A to 4C. FIG. 4A is a view illustrating one example of functioning of the first operating unit of the operating apparatus according to one exemplary embodiment as a starting button.

Referring to FIG. 4A, the first operating unit 111 according to this exemplary embodiment may perform the function of a starting button in the first state. Accordingly, the first operating unit 111 may include a sensor disposed at a particular position 410, for example, at least one of a fingerprint recognition sensor, a pressure sensor, a touch sensor or a push button may be provided as the sensor. Further, to visually represent the position of the sensor, the first operating unit 111 may further include a light source which implements a luminous effect at the corresponding position 410.

Figure 4B:
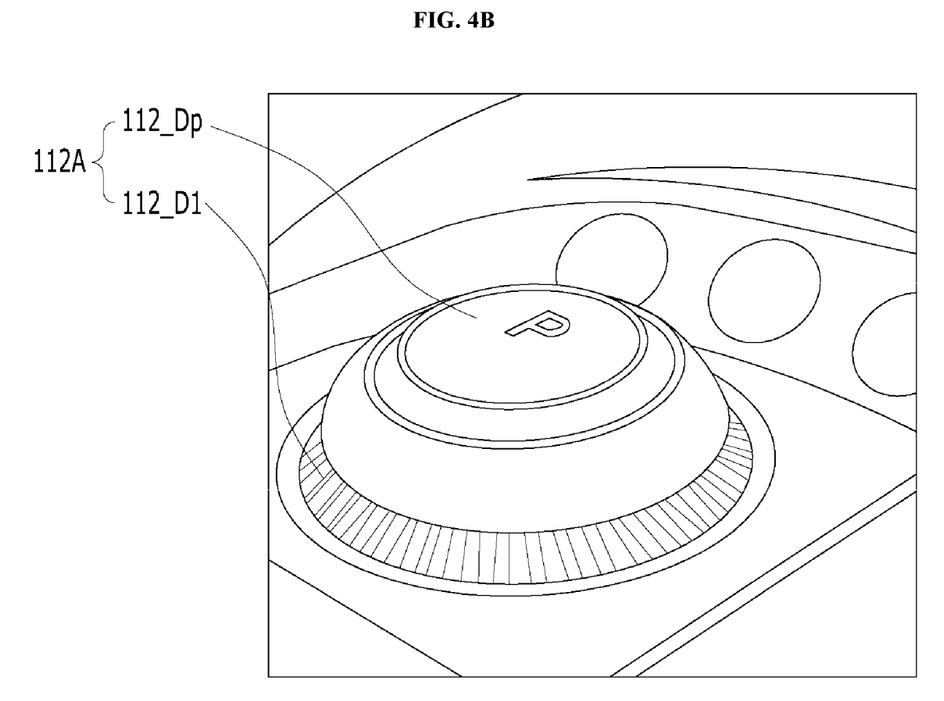
FIGS. 4B and 4C are views illustrating examples of application of the second operating unit of the operating apparatus according to one exemplary embodiment to control of a transmission.
Figure 4C:
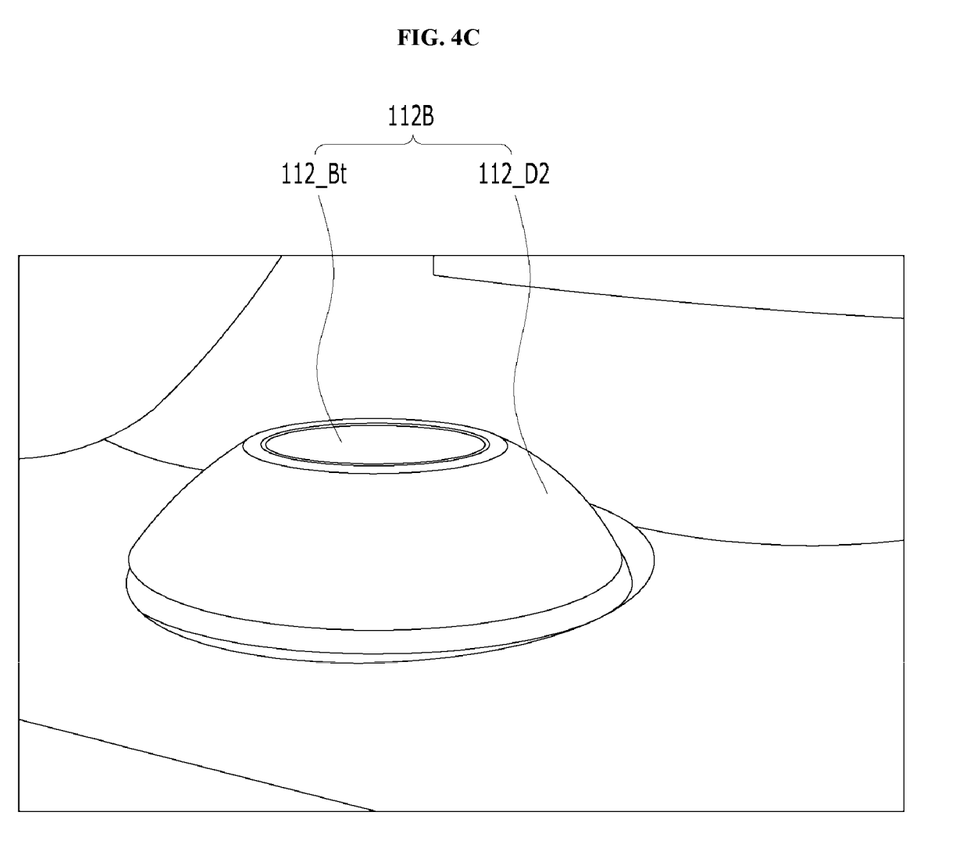

FIGS. 4B and 4C are views illustrating examples of application of the second operating unit of the operating apparatus according to one exemplary embodiment to operate a transmission. Referring to FIG. 4B, a second operating unit 112A may include a display 112_Dp, disposed at the center of the upper surface of the second operating unit 112A, and a dial 112_D1 disposed around the display 112_Dp. Therefore, in a vehicle having a shift-by-wire type transmission installed therein, the second operating unit 112A exposed to the outside in the second state may provide a shift control function. For example, transmission gear position guidance based on the turning direction of the dial 112_D1 and information regarding a current transmission gear position may be displayed on the display 112_Dp, and the gear position of the transmission may be shifted as a driver turns the dial 112_D1.

Alternatively, referring to FIG. 4C, a push button 112_Bt may be disposed at the center of the upper surface of a second operating unit 112B, and a dial 112_D2 having a dome shape, from which one end (corresponding to the top) is cut away, may be disposed around the push button 112_Bt. In particular, the push button 112_Bt may change a drive mode or adjust a mode of the powertrain, such as a boost mode.

Figure 5:
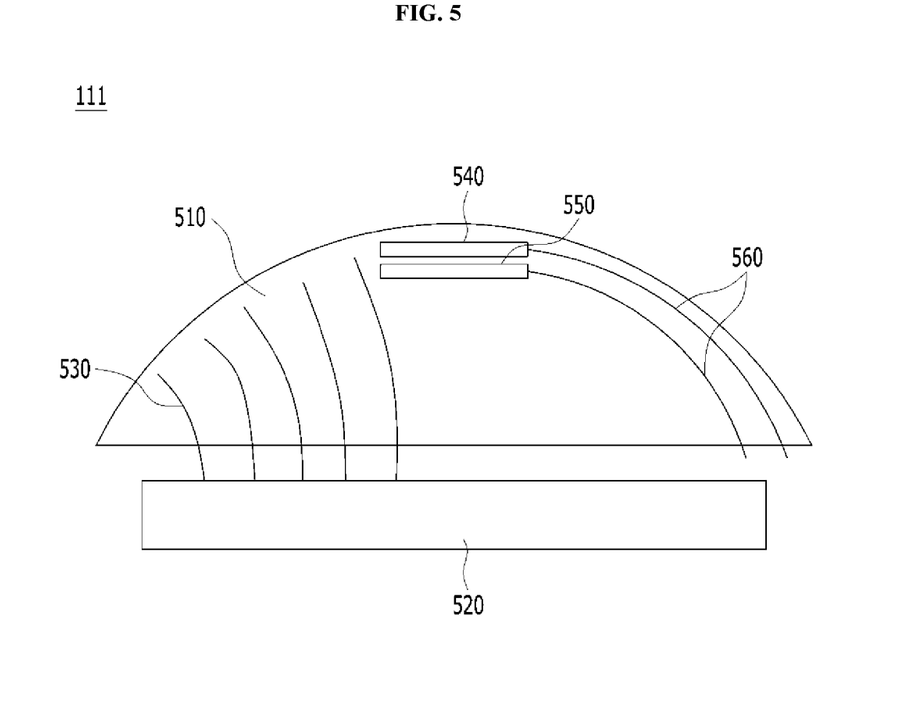
FIG. 5 is a cross-sectional view illustrating one example of the structure of the first operating unit according to one exemplary embodiment.

FIG. 5 is a cross-sectional view illustrating one example of the structure of the first operating unit according to one exemplary embodiment. Referring to FIG. 5, to improve aesthetics of the first operating unit 111 in the first state, a dome-shaped unit 510 formed of a transparent material (e.g., a transparent resin or the like) may be provided, and a light source 520 may be disposed below the dome-shaped unit 510. Further, a plurality of optical paths 530 may be disposed under the outer surface of the dome-shaped unit 510 to show a point light emitting effect, and the optical paths 530 may be formed of optical fibers, without being limited thereto. A sensor (e.g., a fingerprint recognition sensor) 540 may be embedded in the dome-shaped unit 510, as a unit configured to receive an input of a user command, and an auxiliary light source 550, which indicates the position of the sensor 540, may be disposed under the sensor 540. Input/output of electrical signals to and from each of the sensor 540 and the auxiliary light source 550 are enabled through a transparent electrode 560 without marring aesthetics.

Although the above-described exemplary embodiment assumes that the rotating operating unit assembly 100 has a spherical shape, another exemplary embodiment describes an operating unit assembly having a cylindrical shape. This operating unit assembly will be described with reference to FIG. 6.

Figure 6:
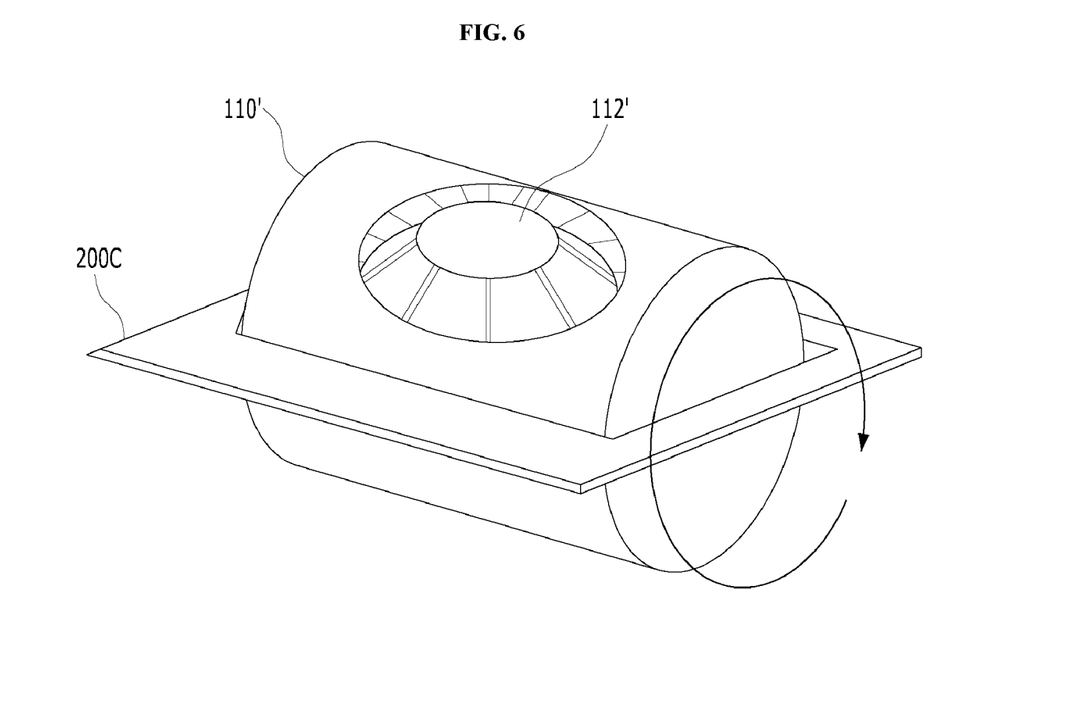
FIG. 6 is a view illustrating one example of the configuration of an operating apparatus according to another exemplary embodiment.

FIG. 6 is a view illustrating one example of the configuration of an operating apparatus according to another exemplary embodiment. Referring to FIG. 6, an operating unit assembly 110' according to another exemplary embodiment may have a cylindrical shape, and may be installed within a housing 200c having a rectangular opening to be rotatable in a direction of extension of the cylindrical operating unit assembly 110'. In particular, to prevent interference of the operating unit assembly 110' with the opening of the housing 200c when the operating unit assembly 110' is rotated, an operating unit, for example, a second operating unit 112', may be disposed such that a portion of the second operating unit 112' is recessed into the operating unit assembly 110' to prevent the apex of the second operating unit 112' from protruding from the outer surface of the cylindrical operating unit assembly 110' in the second state.

Figure 7:
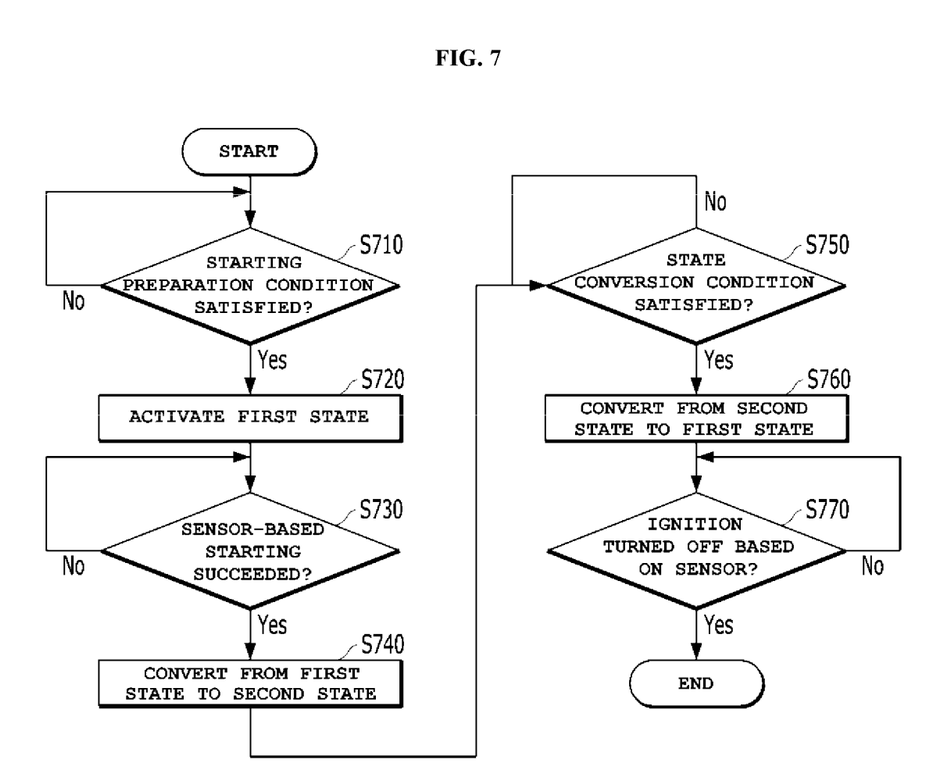
FIG. 7 is a flowchart illustrating one example of a process for controlling an operating apparatus which is applicable to embodiments.

FIG. 7 is a flowchart illustrating one example of a process for controlling an operating apparatus which is applicable to exemplary embodiments. In FIG. 7, it may be assumed that a determination entity in each operation is the controller (not shown) of the operating apparatus. Referring to FIG. 7, the controller may be configured to determine whether a starting preparation condition is satisfied (S710). For example, the starting preparation condition may be a case in which a smart key is sensed in the interior after a driver's seat door is opened in an ignition off state, but is not limited thereto. In another exemplary embodiment, the starting preparation condition may be operation of a specific button.

When the starting preparation condition is satisfied (Yes in S710), the first state of the operating apparatus 100 may be activated (S720). In particular, activation of the first state may include rotation of the operating unit assembly 110 from the second state to the first state, and may refer to activation of the auxiliary light source 550 and the sensor 540, described above with reference to FIG. 5, in the first state in which the first operating unit 111 of the operating unit assembly 110 is exposed to the outside to be operable.

In the activated condition of the first state, when input of a command through sensing (e.g., fingerprint recognition) using the sensor 540 or driver's operation has succeeded (S730), the vehicle may be started (Yes in S730). As the vehicle is started, the operating unit assembly 110 may be converted from the first state to the second state by operating the drive unit 130 (S740), and in the second state, control of a function (e.g., shifting of gear positions of the transmission) through the second operating unit 112 may be performed.

In the second state, whether a state conversion condition is satisfied may be monitored (S750). When the state conversion condition is satisfied, the operating unit assembly 110 may again be converted from the second state to the first state (S760). In particular, the state conversion condition may be input of an ignition off command by a driver. For example, the state conversion condition may be satisfied when a current position of the vehicle, determined using a navigation system, is a position where the vehicle is allowed to be stopped/parked, such as an indoor space, a parking lot, a gas station, a car wash or the like, and the current gear position of the transmission is the gear position park (P), or be satisfied when the driver inputs a specific type of command, without being limited thereto. After conversion to the first state, when the ignition off command is input through sensing using the sensor 540 or driver's operation (Yes in S770), the first state may be deactivated, and the sensor 540, the auxiliary light source 550, the light source 510, etc. may be deactivated or turned off.

Although the above-described exemplary embodiments describe the operating apparatus 100 focused on a driver's operating environment, such as a center console or a center armrest, other exemplary embodiments of the present invention may give consideration to the arrangement of an operating apparatus 100 focused on operation by a passenger seated on a front passenger seat or a rear seat. This will be described below with reference to FIG. 8.

Figure 8:
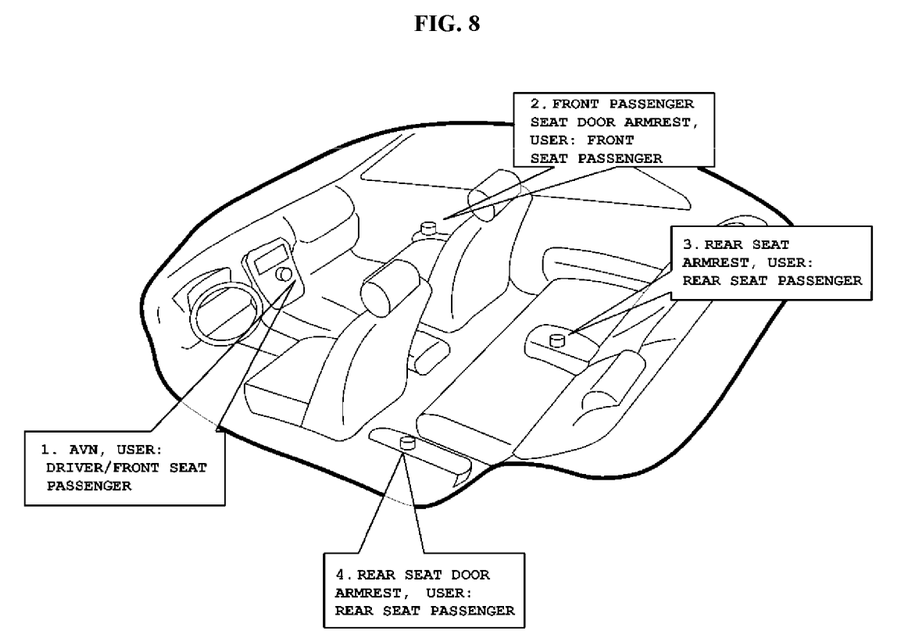
FIG. 8 is a view illustrating various arrangement positions of an operating apparatus according to exemplary embodiments in a vehicle.

FIG. 8 is a view illustrating various arrangement positions of an operating apparatus according to exemplary embodiments in a vehicle. Referring to FIG. 8, various arrangement positions of an operating apparatus are illustrated. As one example, an operating apparatus according to one exemplary embodiment may be arranged or disposed near an audio/video/navigation (AVN) system 1. As another example, the operating apparatus may be arranged or disposed on a front passenger seat door armrest 2, expected to be used by a passenger on a front passenger seat, or a rear seat armrest 3 or a rear seat door armrest 4, expected to be used by a passenger on a rear seat.

If two or more operating apparatuses are arranged at different positions, the functions provided by the respective operating apparatuses in each of the first state and the second state may differ based on the arrangement positions thereof. For example, if the operating apparatus is arranged on the rear seat armrest 3, the operating apparatus may deactivated provide an electronic door latch control function in the first state, and provide a rear seat multimedia control function in the second state. Further, if a rear seat child lock function is provided, the operating apparatus may be operated in the second state when the child lock function is activated.

The present invention may be implemented as computer readable code in a non-transitory computer readable recording medium in which programs are recorded. Such computer readable recording media may include all types of recording media in which data readable by computer systems is stored. For example, the non-transitory computer readable recording media may include a hard disk drive (HDD), a solid-state disk (SSD), a silicon disk drive (SDD), a ROM, a RAM, a CD-ROM, a magnetic tape, a floppy disk, an optical data storage device, etc.

As is apparent from the above description, an in-vehicle control apparatus according to at least one exemplary embodiment of the present invention may more conveniently control functions of a vehicle. Particularly, different hemispheric units may be exposed upwards to the outside by rotating a spherical operating apparatus, thereby being capable of executing different functions based on situations and improving interior design aesthetics.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. An in-vehicle operating apparatus, comprising:
    an operating unit assembly; and
    a drive unit configured to rotate the operating unit assembly about a first axis,
    wherein the operating unit assembly includes:
        a body;
        a first operating unit disposed at a first side of the body and configured to receive a first command to execute at least a first function; and
        a second operating unit disposed at a second side of the body opposite to the first side of the body and configured to receive a second command to execute at least a second function, and
        wherein the body has a shape acquired by cutting away two mutually opposing dome-shaped sides from a sphere.

2. The in-vehicle operating apparatus according to claim 1, further comprising a shaft unit configured to connect the drive unit to the operating unit assembly along the first axis.

3. The in-vehicle operating apparatus according to claim 2, wherein the in-vehicle operating apparatus is disposed on a housing having a first opening and at least the shaft unit and the drive unit are embedded within the housing.

4. The in-vehicle operating apparatus according to claim 3, wherein the drive unit is configured to:
    rotate the operating unit assembly into a first state, in which at least the first operating unit is exposed through the first opening, when a first condition is satisfied; and
    rotate the operating unit assembly into a second state, in which at least the second operating unit is exposed through the first opening, when a second condition is satisfied.

5. The in-vehicle operating apparatus according to claim 4, wherein the housing further includes a second opening disposed in a direction opposite to the first opening.

6. The in-vehicle operating apparatus according to claim 5, wherein:
    at least a portion of the second operating unit is exposed to an outside of the housing through the second opening in the first state; and
    at least a portion of the first operating unit is exposed to the outside of the housing through the second opening in the second state.

7. The in-vehicle operating apparatus according to claim 1, wherein the first function includes an ignition on/off function and the second function includes a transmission control function.

8. The in-vehicle operating apparatus according to claim 7, wherein:
    the first operating unit includes at least one of a fingerprint recognition sensor, a pressure sensor, a touch sensor or a push button; and
    the second operating unit includes a dial configured to be rotated about a second axis configured to intersect the first axis.

9. The in-vehicle operating apparatus according to claim 1, wherein the first operating unit includes a dome-shaped unit.

10. The in-vehicle operating apparatus according to claim 9, wherein a side part of the body and an outer part of the dome-shaped unit have an identical curvature.

11. A method for controlling an in-vehicle operating apparatus, comprising:
    activating, by a controller, a first state of the in-vehicle operating apparatus when a starting preparation condition is satisfied;
    converting, by the controller, the in-vehicle operating apparatus from the first state to a second state when an operating unit assembly of the in-vehicle operating apparatus is operated under an activated condition of the first state; and
    converting, by the controller, the in-vehicle operating apparatus from the second state to the first state when a condition conversion condition is satisfied in the second state,
    wherein the operating unit assembly includes:
        a body;
        a first operating unit disposed at a first side of the body and configured to receive a first command to execute at least a first function; and
        a second operating unit disposed at a second side of the body opposite to the first side of the body and configured to receive a second command to execute at least a second function,
    wherein the first state includes a state in which the first operating unit is operable; and the second state includes a state in which the second operating unit is operable.

12. The method according to claim 11, wherein the in-vehicle operating apparatus further includes:
    a drive unit configured to rotate the operating unit assembly about a first axis; and
    a shaft unit configured to connect the drive unit to the operating unit assembly along the first axis.

13. The method according to claim 12, wherein the in-vehicle operating apparatus is disposed on a housing having an opening and at least the shaft unit and the drive unit are embedded within the housing.

14. The method according to claim 12, wherein:
    the activating the first state includes exposing at least the first operating unit through the opening; and
    the converting to the second state includes exposing at least the second operating unit through the opening.

15. The in-vehicle operating apparatus according to claim 12, wherein:
    the first operating unit includes at least one of a fingerprint recognition sensor, a pressure sensor, a touch sensor or a push button; and
    the second operating unit includes a dial configured to be rotated about a second axis configured to intersect the first axis.

16. The method according to claim 11, wherein the first function includes an ignition on/off function and the second function includes a transmission control function.

17. A non-transitory computer readable recording medium having recorded thereon a program to execute the method according claim 11.

* * * * *